C. H. BISSELL.
PIPE CONNECTION.
APPLICATION FILED JUNE 2, 1913.

1,265,875.

Patented May 14, 1918.

WITNESSES:

INVENTOR.
Carl H. Bissell,
BY
Parsons Hall & Bodell,
ATTORNEY.

UNITED STATES PATENT OFFICE.

CARL H. BISSELL, OF SYRACUSE, NEW YORK, ASSIGNOR TO CROUSE-HINDS COMPANY, OF SYRACUSE, NEW YORK, A CORPORATION OF NEW YORK.

PIPE CONNECTION.

1,265,875.  Specification of Letters Patent.  Patented May 14, 1918.

Application filed June 2, 1913. Serial No. 771,129.

*To all whom it may concern:*

Be it known that I, CARL H. BISSELL, of Syracuse, in the county of Onondaga and State of New York, have invented a new and useful Pipe Connection, of which the following is a specification.

This invention has for its object the production of a pipe connection particularly designed to be used in connection with electrical conduits and service boxes used in the railway service, and the invention consists in the combinations and constructions hereinafter set forth and claimed.

In describing this invention, reference is had to the accompanying drawings in which like characters designate corresponding parts in all the views.

Figure 4:
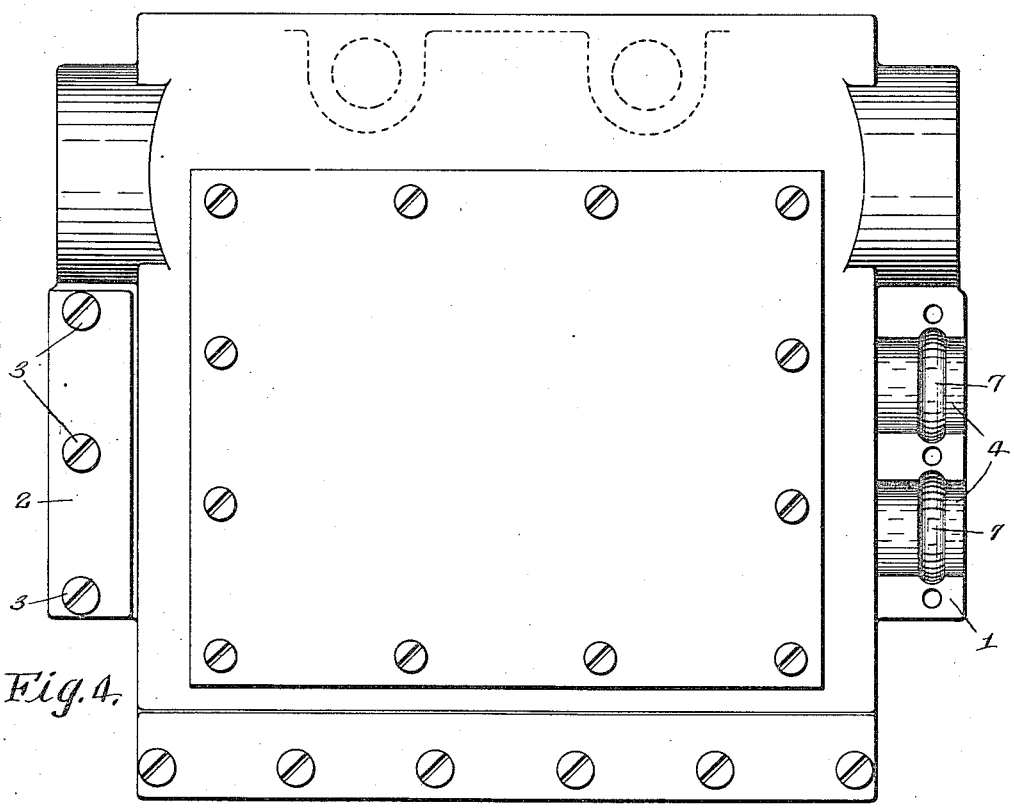
Fig. 4 is a plan of the conduit box shown in Fig. 1.
Figure 1:
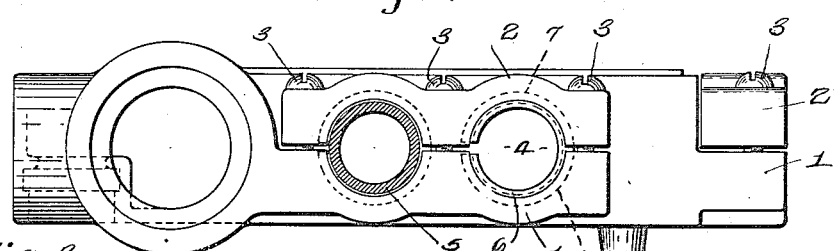
Figures 1 and 2 are respectively an end elevation and sectional fragmentary view of one form of car service box embodying my invention, the conduit or pipe being shown in section in Fig. 1.

This pipe connection comprises a split clamp including two clamping members, one of which is movable relatively to the other, the clamping members confining a passage or opening for receiving the conduit or pipe, and a nut threading on the portion of the pipe in the passage or opening of the clamp and designed to be held from turning by the clamp after the movable clamping member is tightened into its operative position. The nut is split, and the threads of the pipe and the nut constitute interlocking means extending circumferentially of the pipe so that when the contractile ring is contracted onto the pipe, a tight joint is formed between the pipe, the pipe and the clamping member, ring, the pipe and the clamping member, by reason of this interlocking means.

The clamping members are here shown as associated with the service box of a railway car, and 1 and 2 are the clamping members, the member 1 being usually fixed to the box and the member 2 being removable and being clamped into its operative position in any suitable manner as by screws 3. The clamping members 1 and 2 confine a cylindrical opening 4 for receiving the pipe or conduit 5 or the threaded portion thereof and said opening is of greater diameter than the threaded surface of the pipe. The clamping parts 1 and 2 are separable along a plane extending in a direction lengthwise of the opening 4 and clamped toward each other onto the pipe in a direction at an angle to the axis of the pipe.

Figure 3:
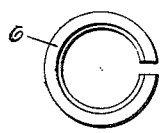
Fig. 3 is an elevation of the threaded ring of the pipe connection.
Figure 2:
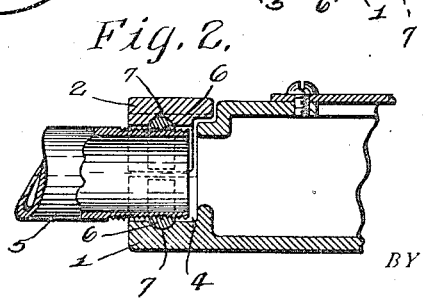

6 is the nut in the form of a ring designed to be threaded on the pipe 5 before the end thereof is inserted in the opening 4, the ring being preferably partly inserted in an annular groove 7 formed in the inner faces of the clamping members 1 and 2. This ring is usually expansible and contractile, and is here shown as split, as seen in Fig. 3 and as being substantially rounding, semi-circular or arc shape in cross-section and fits into the groove 7 which is arc shaped in cross-section.

In operation, after the ring 6 has been turned on the pipe 5, the pipe is laid into the semi-circular opening of the fixed clamping member 1 with the ring fitted into the portion of the groove 7 in the fixed clamping member, the movable clamping member is then placed into position with its section of the groove 7 fitting the ring, and the movable clamping member is then tightened by turning the screws 3. This pipe connection is advantageous in that no turning of the pipe is necessary and the pipe can be always tightly fitted to the service box. It is of particular advantage when the pipe has an elbow and there is not a sufficient space to turn the pipe sufficiently to tighten the same in a threaded opening.

What I claim is:—

1. The combination with a threaded pipe, of a nut threading on the pipe, and a body provided with opposing clamping members having a pipe receiving opening into which the pipe with the nut thereon is placed with the nut within said opening, and means for clamping one member toward the other in a direction at a right angle to the pipe and the nut, substantially as and for the purpose described.

2. The combination with a threaded pipe, of a nut threading on the pipe, and a body provided with clamping members having a pipe receiving opening and an internal annular groove for receiving the nut, the line of division between the clamping members extending lengthwise of the axis of the opening, and means for clamping one member toward the other onto the pipe and the nut, substantially as and for the purpose specified.

3. The combination with a threaded pipe, of an expansible and contractile split nut threading on the pipe, and a body provided with a clamp having a pipe opening for receiving the pipe and the nut thereon and including opposing members, the members being separated in a direction lengthwise of the axis of the opening, and means for clamping one of the members toward and from the other in a direction at an angle to the axis of said opening, substantially as and for the purpose set forth.

4. The combination with a threaded pipe, of an expansible and contractile split nut threading on the pipe, and a body provided with a clamp having a pipe opening for receiving the pipe, and an internal annular groove around the opening for receiving the nut, the clamp including opposing members, the members being separated in a direction lengthwise of the axis of the opening, and means for clamping one of the members toward and from the other in a direction at an angle to the axis of said opening, substantially as and for the purpose described.

5. The combination with a threaded pipe, of an expansible and contractile split nut semicircular in cross section threading on the pipe, and a body provided with a clamp having a pipe opening for receiving the pipe, and an internal annular groove around the opening for receiving the nut, the groove fitting the nut, said clamp including members separated in a direction lengthwise of the axis of the opening and the groove, and means for clamping one of the members toward and from the other in a direction at an angle to the axis of said opening, substantially as and for the purpose specified.

6. The combination with a threaded pipe, of an expansible and contractile ring threading on the pipe, and the body formed with a split clamp having a pipe receiving opening, the clamp including members separated in a direction lengthwise of the axis of the opening, the clamp being also formed with an internal annular groove around the opening for receiving the ring, substantially as and for the purpose set forth.

7. The combination with a threaded pipe, of an expansible and contractile ring threading on the pipe, and the body formed with a split clamp having a pipe receiving opening, the clamp including members separated in a direction lengthwise of the axis of the opening, the clamp being also formed with an internal annular groove around the opening for receiving the ring, the ring being semicircular in cross-section, and the groove being semi-circular in cross section, and means for clamping said members toward each other in a direction at an angle to the axis of the pipe opening, substantially as and for the purpose described.

8. The combination with a pipe and a body to which the pipe is connected; of a pipe joint between the pipe and the body comprising a contractile, split, internally-threaded ring threading on the pipe, and means associated with the body for contracting the ring on the pipe without turning the ring, substantially as and for the purpose specified.

In testimony whereof, I have hereunto signed my name in the presence of two attesting witnesses at Syracuse, in the county of Onondaga, in the State of New York, this 16th day of May, 1913.

CARL H. BISSELL.

Witnesses:
WM. CORNELL BLANDING,
C. C. SCHOENECK.